Figure 1:
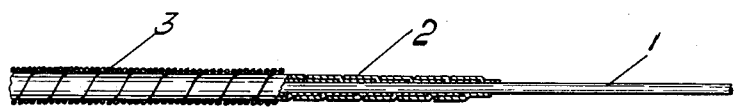

July 4, 1939.  S. W. ALDERFER  2,164,981

ELECTRICAL CONDUCTOR AND INSULATING MATERIAL THEREFOR

Filed Oct. 3, 1936

INVENTOR
STERLING W. ALDERFER

BY

ATTORNEY

Patented July 4, 1939

2,164,981

UNITED STATES PATENT OFFICE 2,164,981

ELECTRICAL CONDUCTOR AND INSULATING MATERIAL THEREFOR

Sterling W. Alderfer, Akron, Ohio, assignor of one-half to Edward D. Andrews, Akron, Ohio Application October 3, 1936, Serial No. 103,917

1 Claim. (Cl. 91—68)

The present invention relates to a new and improved electrical conductor and insulating material which possess new and valuable properties and are superior to known insulating materials. The advantages of the new material will be apparent to those skilled in the art to which the invention appertains.

Figure 2:
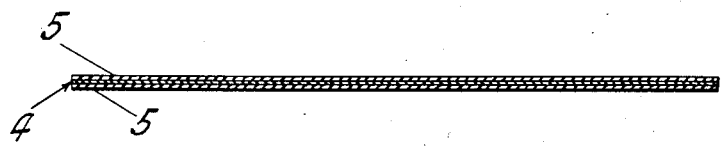

In the drawing in which the best known or preferred form of the invention is shown:

Fig. 1 is a view of an insulated wire or cable to which the improved material is applied, the several layers being broken away to show the construction; and Fig. 2 is a longitudinal section through the material.

In the drawing, 1 represents a wire or cable for the transmission of an electrical current, 2 the new insulating material and 3 a braided jacket. It will be understood that the application of the insulating material as shown is selected as one of the forms in which the invention may be usefully employed.

The new insulating material is composed of a thin, flexible and elastic film of the type known as a rubber hydrohalide film which is preferably a rubber hydrochloride compound made in sheet form. This film is indicated by the numeral 4. The material of this film is flexible, stretchable and possesses high dielectric properties. To the opposite sides of this film are applied thin coatings of latex rubber indicated by the numerals 5. These coatings are composed of natural or artificial rubber latex which is preferably compounded with vulcanizing ingredients so that after the latex is applied, it may be completely or partially vulcanized. The latex coatings have high dielectric properties and when used in combination with the rubber hydrohalide film the combined film has unusually high insulating qualities. These properties are present in a very thin, combined layer. For example, the hydrohalide film may be of a thickness of .0014 of an inch and the latex coatings of .0035 of an inch thickness, making a combined thickness of the insulating material of .0084 of an inch. In addition to its high dielectric property, the material will stretch and can be drawn down much thinner without appreciable loss of its insulating properties.

It is possible to apply the latex coating to one side of the rubber hydrohalide film if desired, but the two coatings are preferred.

In the manufacture of the material with the coating on both sides, a sheet or web of the rubber hydrohalide film is passed through a bath of latex prepared with the proper vulcanizing and compounding ingredients known in the art and then through suitable drying and vulcanizing ovens. The surfaces may then be dusted so as wholly or partially to eliminate the tackiness of the layers of vulcanized latex.

If the insulating material is to be used as a wrapping for a wire or cable, it is slit into ribbons or tapes and these ribbons are wrapped spirally about the wire with a sufficient overlap to insure adequate coverage. The latex coatings will adhere to one another so that a tight joint is obtained between the turns of the wrapping. This makes it unnecessary to give the wire a supplementary coating of rubber or asphalt. The wire may then be covered with the usual fabric jacket 3.

The material will stretch under tension which may be applied during the wrapping operation and this will insure a tight covering about the wire. If heated, due to the characteristics of the film, the stretchability or ductility of the tape is increased. The latex coating upon the rubber hydrohalide film increases its ability to stretch without breaking or rupturing, so that it is possible to exert a much higher tension and consequently to draw down the rubber hydrohalide tape much thinner than would be possible with this substance alone. It is thus possible to draw down the tape to any desired thinness without destroying or rupturing the film or the coating thereon.

Owing to the high dielectric property of the combined film, it is possible to secure maximum insulation with a very thin layer of the material. The film is also non-inflammable and very flexible. If desired, two or more coatings of the latex may be applied which will eliminate any tendency to porosity of the coating.

These and other useful and valuable properties will be apparent to those skilled in the art. It will be understood that the invention is not restricted to the exact combination shown herein, but may be varied or modified within the fair scope of the claim.

What is claimed is:

Dielectric sheet material consisting of an elastic laminated structure composed of a film of rubber hydrohalide and adherent coatings of vulcanized latex rubber bonded to opposite faces thereof throughout its area.

STERLING W. ALDERFER.